US012589711B1

(12) United States Patent
Murphy et al.

(10) Patent No.: US 12,589,711 B1
(45) Date of Patent: Mar. 31, 2026

(54) LOCKBAR FOR A CRASH LOCKING TONGUE AND A METHOD OF ASSEMBLY THEREOF

(71) Applicant: Autoliv ASP, Inc., Ogden, UT (US)

(72) Inventors: Dan Murphy, Auburn Hills, MI (US); Jon Burrow, Auburn Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 19/234,483

(22) Filed: Jun. 11, 2025

(51) Int. Cl.
| | |
|---|---|
| *B60R 22/185* | (2006.01) |
| *A44B 11/25* | (2006.01) |
| *B60R 22/12* | (2006.01) |
| *B60R 22/18* | (2006.01) |

(52) U.S. Cl.
CPC ........ B60R 22/185 (2013.01); A44B 11/2561 (2013.01); B60R 22/12 (2013.01); *B60R 2022/1812* (2013.01)

(58) Field of Classification Search
CPC ..................... B60R 22/185; B60R 2022/1812
See application file for complete search history.

(56) References Cited

U.S. PATENT DOCUMENTS

| | | | | |
|---|---|---|---|---|
| 5,222,278 A | * | 6/1993 | Ball | A44B 11/2553 297/483 |
| 5,599,070 A | * | 2/1997 | Pham | B60N 2/688 297/483 |
| 5,806,148 A | * | 9/1998 | McFalls | A44B 11/2561 24/171 |

| | | | | |
|---|---|---|---|---|
| 5,870,816 A | * | 2/1999 | McFalls | B60R 22/30 29/434 |
| 10,518,740 B2 | * | 12/2019 | Ruthinowski | A44B 11/2561 |
| 11,142,161 B2 | | 10/2021 | Clauss et al. | |
| 11,254,282 B2 | * | 2/2022 | Garcia Stopier | B60R 22/1855 |
| 2006/0138852 A1 | * | 6/2006 | Ichida | A44B 11/2557 297/483 |
| 2007/0138783 A1 | * | 6/2007 | Gleason | B60R 22/24 297/483 |
| 2012/0240358 A1 | * | 9/2012 | Cox | A44B 11/2561 24/164 |
| 2017/0055643 A1 | * | 3/2017 | Knoedl | A44B 11/2561 |

(Continued)

FOREIGN PATENT DOCUMENTS

| | | | | | |
|---|---|---|---|---|---|
| CN | 111491831 A | * | 8/2020 | ........ | A44B 11/2553 |
| DE | 202010013986 U1 | * | 3/2012 | ........ | A44B 11/2553 |

(Continued)

*Primary Examiner* — Nicole T Verley
(74) *Attorney, Agent, or Firm* — Dickinson Wright PLLC

(57) ABSTRACT

A lockbar in a tongue of a seat belt system in a vehicle, wherein the crash locking tongue includes the lockbar, a base plate, and a cover material overmolded onto the base plate. The base plate is configured to be reversibly coupled to a buckle in the seat belt system and to have a slot through which a belt webbing extends in order to restrain the movement of a passenger in the vehicle. The lockbar includes one or more fins located on a bottom surface near a front edge, a pair of guide wings located on a back edge adjacent to opposite sides, a clamping surface that is in contact with the belt webbing, and an elastomeric spring. The lockbar undergoes a vertical translation upon a vehicle accident that causes a clamping surface to apply an inward pressure on the belt webbing, thereby, reducing movement of the belt webbing.

18 Claims, 9 Drawing Sheets

(56)                  References Cited

U.S. PATENT DOCUMENTS

2017/0355349  A1 *  12/2017  Betz ................... B60R 22/1855
2019/0239598  A1 *   8/2019  Ver Hoven ........ A44B 11/2561
2020/0216014  A1 *   7/2020  Garcia Stopier  ... B60R 22/1855
2020/0298791  A1     9/2020  Clauss et al.
2021/0197760  A1 *   7/2021  Nagasawa ............ B60R 22/023

FOREIGN PATENT DOCUMENTS

DE        102013003109  A1 *   8/2014   ............ B60R 22/00
DE        102016106440  A1 *  10/2017   ........ B60R 22/1855
DE        202019100137  U1 *   4/2019   ............ B60R 22/18
DE        102016106440  B4 *   5/2019   ............ B60R 22/18
DE        102014017788  B4 *   3/2020   ........ B60R 22/1855
DE        102020201614  A1     8/2021
JP           2010162921  A  *   7/2010
JP           2013107422  A  *   6/2013
JP           2014046721  A  *   3/2014
JP           2014108762  A  *   6/2014
JP           2014125022  A  *   7/2014
JP           2015020580  A  *   2/2015
JP              5943512  B2 *   7/2016   ........ A44B 11/2561
JP           2018135017  A  *   6/2018
JP           2018127107  A  *   8/2018   ........ A44B 11/2561
TW              1640444  B  *  11/2018   ........ A44B 11/2557
WO     WO-2006072314  A1 *   7/2006   .......... B60R 22/185
WO     WO-2006092206  A1 *   9/2006   ........ B60R 22/1855
WO     WO-2013099590  A1 *   7/2013   ........ A44B 11/2553
WO     WO-2014152152  A1 *   9/2014   ............ B60R 21/18

* cited by examiner

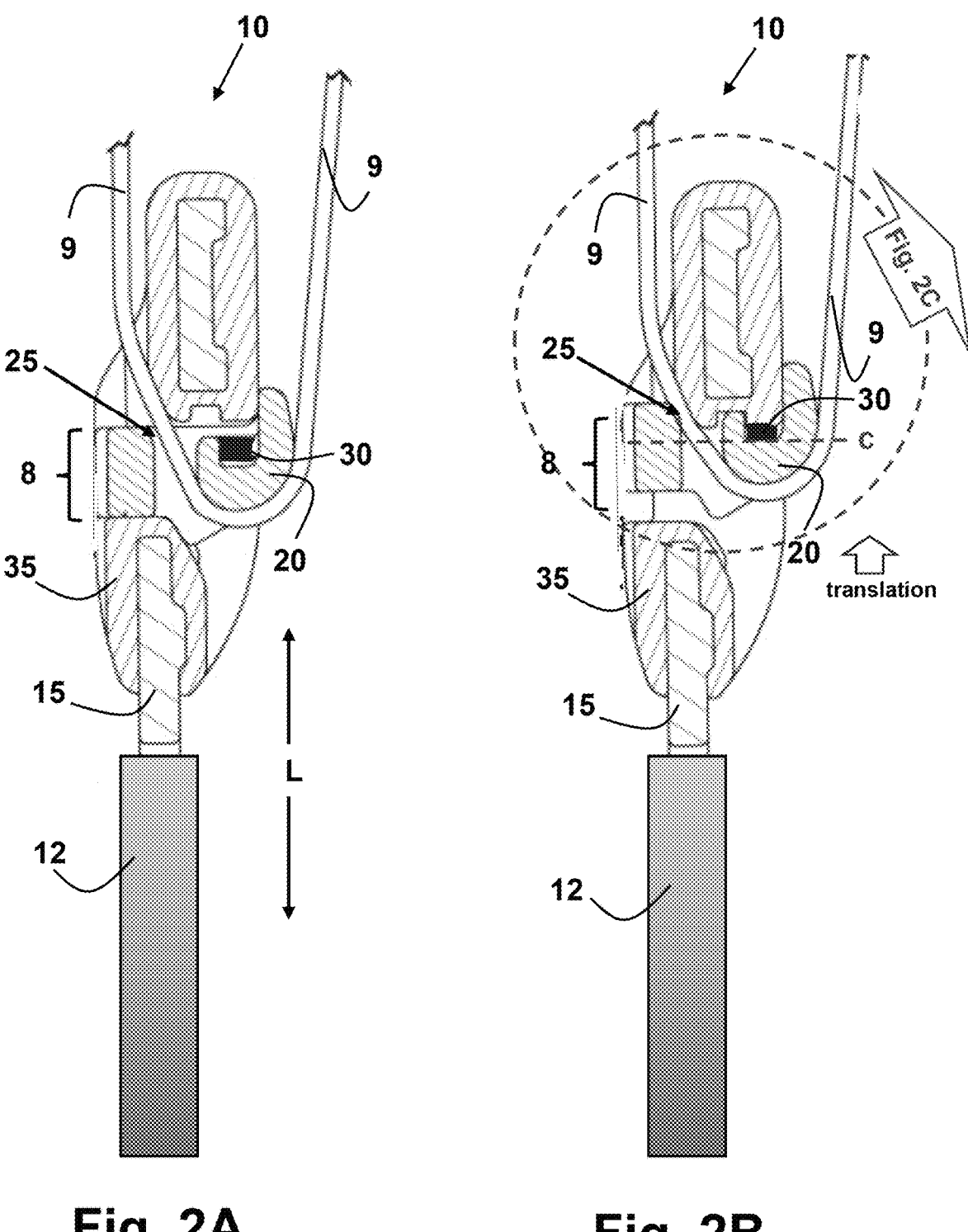
Fig. 2A          Fig. 2B

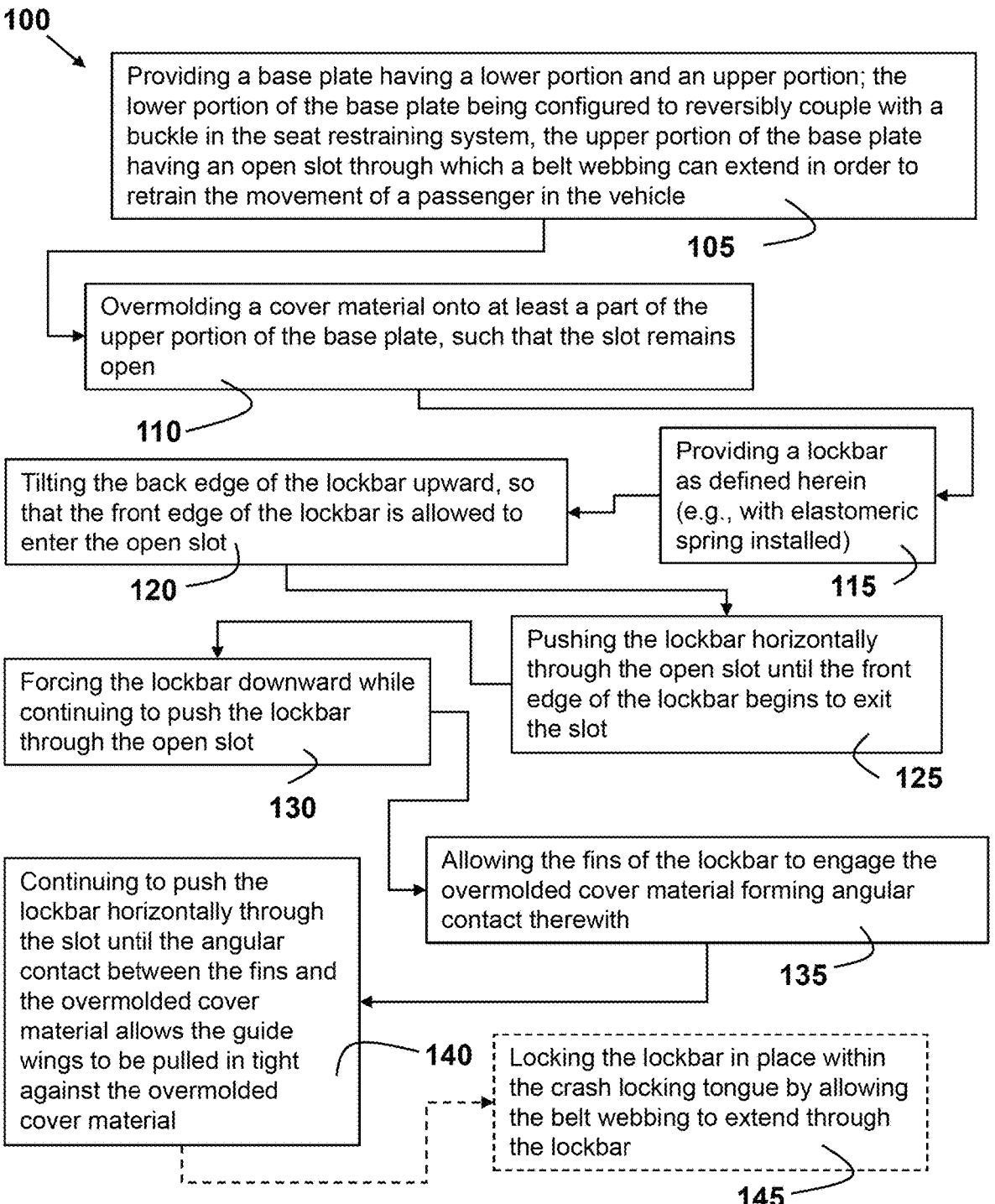

100

Providing a base plate having a lower portion and an upper portion; the lower portion of the base plate being configured to reversibly couple with a buckle in the seat restraining system, the upper portion of the base plate having an open slot through which a belt webbing can extend in order to retrain the movement of a passenger in the vehicle

105

Overmolding a cover material onto at least a part of the upper portion of the base plate, such that the slot remains open

110

Providing a lockbar as defined herein (e.g., with elastomeric spring installed)

115

Tilting the back edge of the lockbar upward, so that the front edge of the lockbar is allowed to enter the open slot

120

Pushing the lockbar horizontally through the open slot until the front edge of the lockbar begins to exit the slot

125

Forcing the lockbar downward while continuing to push the lockbar through the open slot

130

Allowing the fins of the lockbar to engage the overmolded cover material forming angular contact therewith

135

Continuing to push the lockbar horizontally through the slot until the angular contact between the fins and the overmolded cover material allows the guide wings to be pulled in tight against the overmolded cover material

140

Locking the lockbar in place within the crash locking tongue by allowing the belt webbing to extend through the lockbar

LOCKBAR FOR A CRASH LOCKING TONGUE AND A METHOD OF ASSEMBLY THEREOF

FIELD

This invention generally relates to a lockbar incorporated into a crash locking tongue that enhances the ability to restrain a passenger in a motor vehicle upon the occurrence of an accident or crash. This invention further relates to a seat belt restraining system that incorporates such a crash locking tongue, as well as a method of assembling the lockbar into the crash locking tongue

BACKGROUND

The statements in this section merely provide background information related to the present disclosure and may not constitute prior art.

A seat belt restraining system in a motor vehicle generally includes a belt webbing that can be freely pulled from a retractor and coupled via a tongue plate to a seat buckle secured to the body of the vehicle in order for a passenger to be physically restrained in a seat. In the event of a vehicle accident or crash, a locking mechanism is triggered in the retractor that prevents further pulling of the belt webbing. The use of a crash locking tongue further enhances the restraint of the passenger by locking the belt webbing in place upon the occurrence of the accident.

Although the benefits associated with using a crash locking tongue are recognized in the industry, conventional crash locking tongues also exhibit multiple disadvantages. For example, such conventional crash locking tongues are generally large in size, heavy in weight, and expensive to manufacture. Additional areas of concern include the design complexity and the number of components associated with the lockbar within the crash locking tongue. Conventional crash locking tongues also are limited in that they must be used with only specific types of belt webbing. Thus, there is considerable industrial interest in the development of a next generation crash locking tongue that is smaller, lighter, less complex, lower in cost, and works with a wider range of webbing types.

SUMMARY

The present disclosure generally provides a crash locking tongue that incorporates a lockbar formed according to the present disclosure for use as part of a seat belt restraining system that includes a buckle that is reversibly coupled with the crash locking tongue and a belt webbing that restrains the movement of a passenger in a vehicle. The crash locking tongue generally includes a base plate having a lower portion and an upper portion along with a cover material overmolded onto the base plate. The lower portion of the base plate is configured to be reversibly coupled to a buckle in the seat belt restraining system and the upper portion of the base plate has a slot through which the belt webbing extends in order to restrain the movement of a passenger in the vehicle.

The lockbar in the crash locking tongue comprises: a back edge and a front edge, the front edge being configured to pass through the slot in the upper portion of the base plate; one or more fins configured to assist in positioning the lockbar in the slot, the fins being located on a bottom surface of the lockbar near the front edge; a pair of guide wings configured to prevent the lockbar and the overmolded cover material from becoming disengaged when the seat belt restraining system is in use, each of the guide wings being located on the back edge adjacent to opposite sides of the lockbar; a clamping surface that is in contact with the belt webbing; and an elastomeric spring. The belt webbing loops around the lockbar when the crash locking tongue and the buckle are coupled.

The crash locking tongue is configured such that the lockbar undergoes a vertical translation upon the occurrence of a vehicle accident. The vertical translation of the lockbar applies an inward pressure or force on the belt webbing, thereby, reducing or eliminating further movement of the belt webbing. The inward pressure occurs between the clamping surface of the lockbar and one or more of the overmolded cover material and the base plate. The belt webbing includes a torso side that faces the passenger with the vertical translation of the lockbar applying the pressure to this torso side.

The vertical translation of the lockbar compresses the elastomeric spring present in the crash locking tongue. When desirable to further enhance the engagement between the lockbar and the belt webbing, the lockbar may be configured with one or more openings that will allow at least a portion of the compressed elastomeric spring to be forced through the one or more openings, such that the elastomeric spring also makes contact the belt webbing.

The crash locking tongue may also comprise at least one overlap region between the guide wings of the lockbar and the overmolded cover material and/or the base plate. These overlap region(s) are designed to assist in preventing disengagement of the lockbar and the overmolded cover material and/or base plate during use. The lockbar is also prevented from being removed from the crash locking tongue by the thickness of the belt webbing.

When the lockbar is assembled in the crash locking tongue, the elastomeric spring contacts the overmolded cover material and/or the base plate with such a tight fit that buzz, squeak, and rattle (BSR) in the seat belt restraining system is reduced or prevented.

The crash locking tongue may also comprise at least one interlock region formed by features of the lockbar and the overmolded cover material. This interlock region is designed to assist in load distribution during use. The formation of this interlock region by the lockbar and the overmolded cover material stops the occurrence of any further compression of the elastomeric spring and/or vertical translation of the lockbar.

The one or more fins in the lockbar provide for angular contact with the overmolded cover material. This angular contact allows the guide wings to be pulled in tight against the overmolded cover material.

When desirable, the lockbar may further comprise one or more strengthening ribs. These strengthening ribs allow for more efficient load transfer from the lockbar into the overmolded cover material due to an increase in surface area. The strengthening ribs may also reduce rocking of the lockbar when assembled in the crash locking tongue.

According to another aspect of the present disclosure, a seat belt restraining system is provided that comprises a buckle, a belt webbing to restrain the movement of a passenger in a vehicle, and a crash locking tongue that comprises the lockbar as described above and as further defined herein. In this seat belt restraining system, the compression of the elastomeric spring upon the vertical translation of the lockbar enhances the engagement between the lockbar and the belt webbing. The pressure applied to the belt webbing clamps the belt webbing in place on a side of the belt webbing that faces the passenger. In this case, the clamping of the belt webbing provides a maximum webbing resistance as defined by the Capstan or belt friction equation.

According to yet another aspect of the present disclosure, a method of assembling a lockbar in a crash locking tongue for use in a seat belt restraining system of a vehicle is provided. This method generally comprises the steps of: providing a base plate having a lower portion and an upper portion, the lower portion of the base plate being configured to reversibly couple with a buckle in the seat restraining system, the upper portion of the base plate having an open slot through which a belt webbing can extend in order to retrain the movement of a passenger in the vehicle; over-molding a cover material onto at least a part of the upper portion of the base plate, such that the slot remains open; providing a lockbar formed as described above and further defined herein; tilting the back edge of the lockbar upward, so that the front edge of the lockbar is allowed to enter the open slot; pushing the lockbar horizontally through the open slot until the front edge of the lockbar begins to exit the slot; forcing the lockbar downward while continuing to push the lockbar through the open slot; allowing the fins of the lockbar to engage the overmolded cover material forming angular contact therewith; and continuing to push the lock-bar horizontally through the slot until the angular contact between the fins and the overmolded cover material allows the guide wings to be pulled in tight against the overmolded cover material. When desirable, the method may further comprise locking the lockbar in place within the crash locking tongue by allowing the belt webbing to extend through the lockbar.

Further areas of applicability will become apparent from the description provided herein. One skilled in the art will understand that the description and specific examples presented herein are intended for purposes of illustration only and are not intended to limit the scope of the present disclosure.

DRAWINGS

In order that the disclosure may be well understood, there will now be described various forms thereof, given by way of example, reference being made to the accompanying drawings.

FIG. 2A is a cross-sectional view of a crash locking tongue with a lockbar formed according to the teachings of the present disclosure shown in a locked or buckled position.

FIG. 2B is another cross-sectional view of the crash locking tongue of FIG. 2A shown in a post-lock position after the occurrence of a motor vehicle accident or crash.

FIG. 7 is a flowchart of a method for assembling the lockbar in a crash locking tongue according to another aspect of the present disclosure.

Figure 1:
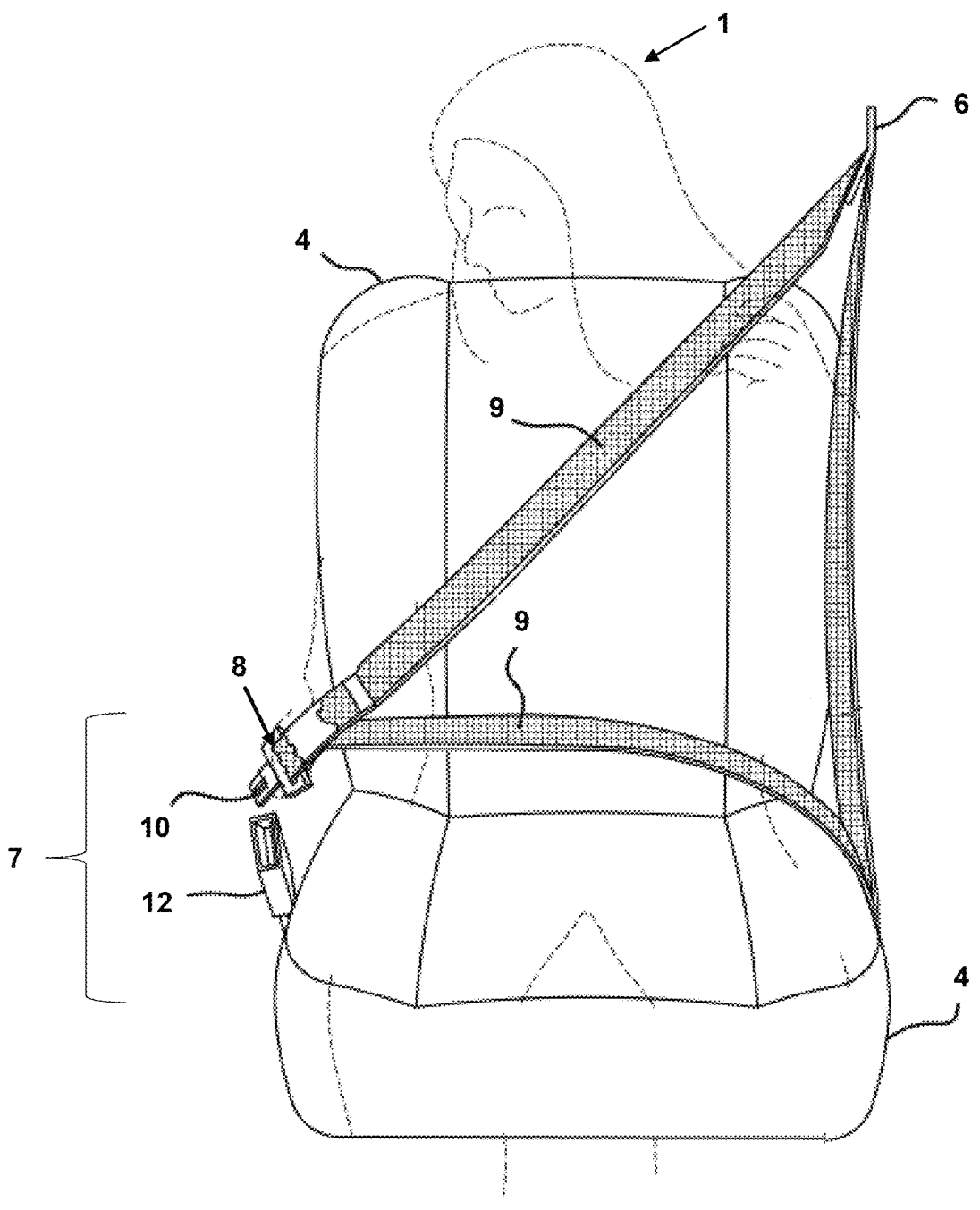
FIG. 1 is a schematic representation of a seat belt restraining system in a vehicle that incorporates a crash locking tongue (CLT) that includes the lockbar formed according to the teachings of the present disclosure.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. For example, the crash locking tongue with the lockbar made and used according to the teachings contained herein is described throughout the present disclosure in conjunction with a seat belt restraining system in a motor vehicle (e.g., an automobile) in order to more fully illustrate the composition and the use thereof. The incorporation and use of such a tongue assembly that incorporates the lockbar in other vehicles, including off-road vehicles, trucks, boats, helicopters, and other aircraft or the like are contemplated to be within the scope of the present disclosure. One skilled in the art will understand that throughout the description, corresponding reference numerals indicate like or corresponding parts and features.

The present disclosure relates generally to a crash locking tongue for use in a motor vehicle seat belt system that includes a buckle, which is reversibly coupled with the crash locking tongue, and a belt webbing that restrains the movement of a passenger in a vehicle. Referring to FIG. 1 a seat belt restraining system 7 for a motor vehicle is depicted. During the operation of the motor vehicle, a passenger 1 in the vehicle will sit in a seat 4 and be restrained by a length of belt webbing 9 that is anchored to the vehicle's body. More specifically, one portion of the belt webbing 9 is secured to an anchor point 6. The opposite end of the belt webbing 9 is attached to a retractor (not shown), which is also secured to the vehicle's body. Intermediate to the ends of the belt webbing 9, the webbing 9 passes through a slot 8 in a crash locking tongue assembly 10 that is part of the seatbelt restraining system 7. When the seat belt restraining system 7 is in use, the crash locking tongue assembly 10 latches with a seat buckle 12 that is also secured on its opposite end to the body of the vehicle (not shown), thereby, restraining the torso of the passenger 1 against the seat 4. When the seat belt restraining system 7 is not in use, the belt webbing 9 is wound on the retractor with a portion of the webbing 9 becoming vertically oriented on one side of the seat 4 with the crash locking tongue assembly 10 hanging therefrom (i.e., not coupled to the buckle 12).

The crash locking tongue formed according to the present disclosure provides multiple advantages in the form of improved compatibility with the belt webbing, reduced mass, reduced manufacturing cost, improved strength, and a reduced level of complexity (e.g., less components). In addition, the clamping surface of the lockbar applies a force that works with the forces associated with the belt webbing rather than in opposition thereto. Thus, the use of the crash locking tongue maximizes the webbing resistance as determined according to the Capstan or belt friction equation (e.g., Euler-Eytelwein formula).

Figure 2C:
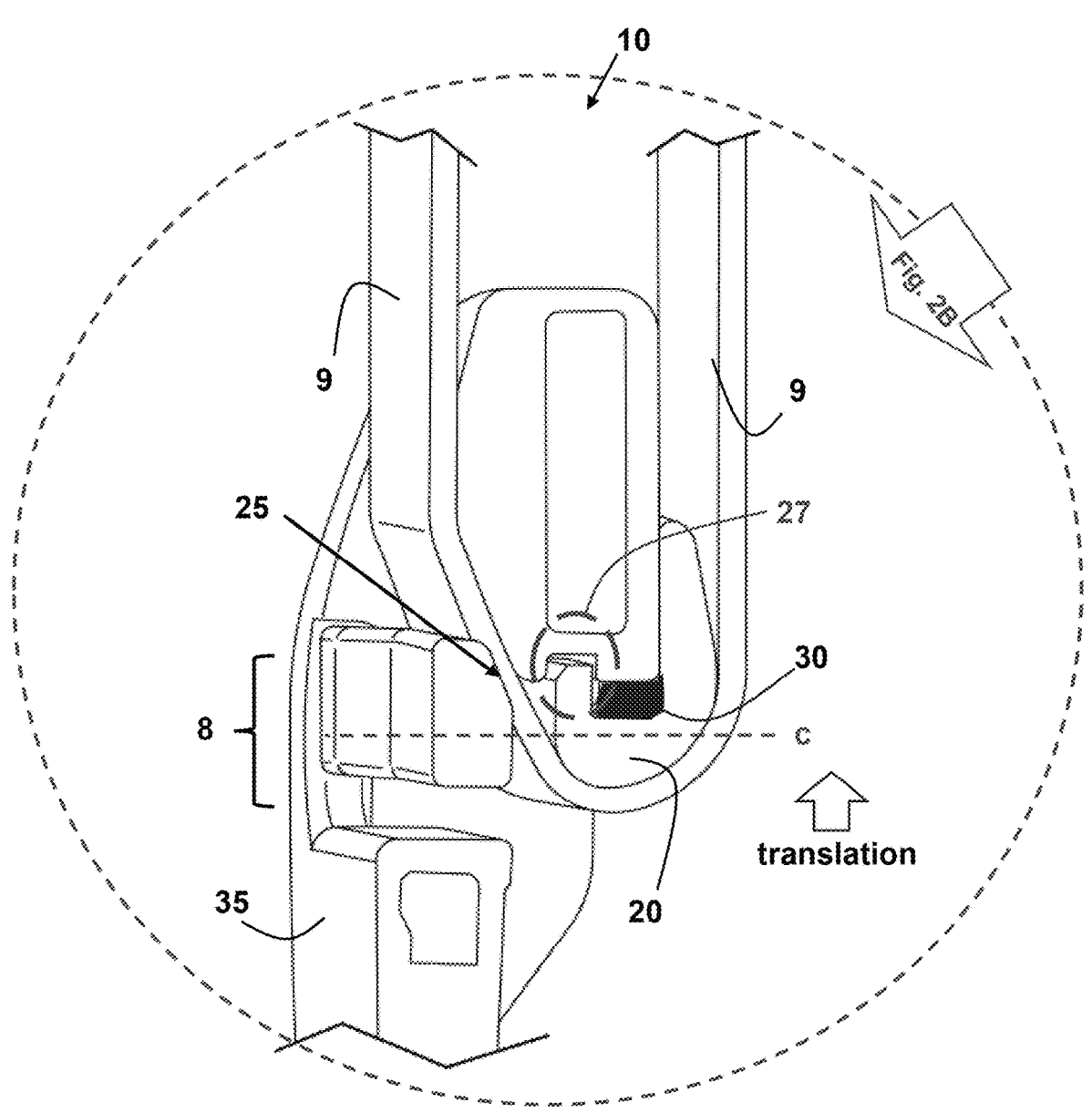
FIG. 2C is an enlarged cross-sectional view of a portion of the crash locking tongue of FIG. 2B.

Referring now to FIGS. 2A to 2C, the crash locking tongue 10 generally comprises a base plate 15 configured to reversibly couple with a seat buckle 12, a lockbar 20 that has a clamping surface 25 that is in contact with the belt webbing 9, an elastomeric spring 30, and a cover material 35 overmolded on the base plate. The lockbar 20, which has a centerline c, is installed in a slot 8 located within the base plate 15 with the centerline c being perpendicular to the length L of the crash locking tongue. The crash locking tongue 10 is configured such that the lockbar 20 undergoes a vertical translation (⇧) upon the occurrence of a vehicle accident. The vertical translation (⇧) of the lockbar 20 applies an inward pressure on the belt webbing 9, thereby, reducing or eliminating movement of the belt webbing 9.

The crash locking tongue may initially be in a free-state condition, which means that it is not coupled to the seat buckle. In this case, the crash locking tongue as stated above may interact with and hang from the belt webbing. In FIG. 2A, the crash locking tongue 10 is coupled to the seat buckle 12. In this buckled-state condition, the belt webbing 9 loops around the lockbar 20, thereby restraining the passenger in the seat. Upon the occurrence of a vehicle crash or accident as shown in FIG. 2B and in the enlarged view provided in FIG. 2C, the lockbar 20 translates vertically, thereby, compressing the elastomeric spring 30. In other words, the lockbar 20 applies a pressure or force to the belt webbing 9, which further pinches the webbing 9 between the clamping surface 25 of the lockbar 20 and one or more of the overmolded cover material 35 and the base plate 15. Alternatively, the webbing 9 is pinched between the clamping surface 25 and the overmolded cover material 35 and/or the base plate 15. In this post-lock position, the movement of the webbing 9 is effectively reduced or eliminated and the passenger is further restrained in the seat of the vehicle.

Still referring to FIG. 2C, the overmolded cover material 35 and the lockbar 20 are also shown to form an interlock region 27. As the elastomeric spring 30 is compressed by the vertical translation (⇧) of the lockbar 20 upon the occurrence of a vehicle crash or accident, a portion of the lockbar 20 travels into an indentation in the overmolded cover material 35 thereby forming the interlock region 27. The creation of such an interlock region 27 stops the lockbar 20 from any further vertical translation and/or compression of the elastomeric spring 30. The formation of this interlock region 27 effectively assists in load distribution within the seat belt restraining system.

Figures 3A, 3B:
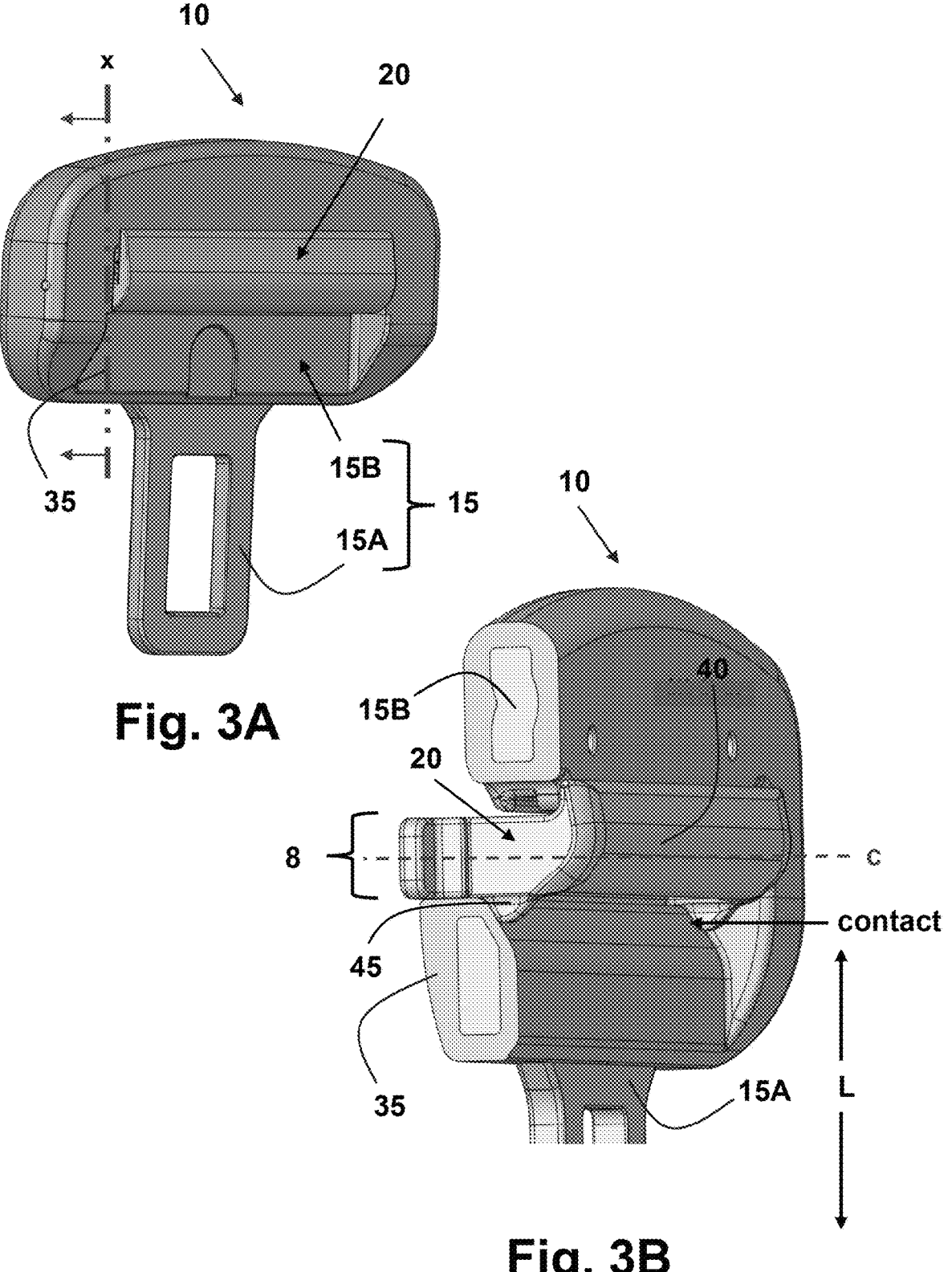
FIG. 3A is a perspective view of the front side of a crash locking tongue according to the teachings of the present disclosure.
FIG. 3B is a partial cross-sectional view of the crash locking tongue of FIG. 3A taken along plane x.

Referring now to FIGS. 3A and 3B, the crash locking tongue 10 generally includes the lockbar 20, a base plate 15 having a lower portion 15A and an upper portion 15B, and a cover material 35 overmolded onto the base plate 15, alternatively onto the upper portion 15B of the base plate 15. The lower portion 15A of the base plate 15 is configured to be reversibly coupled to a buckle in the seat belt restraining system and the upper portion 15B of the base plate 15 has a slot 8 through which a belt webbing extends in order to restrain the movement of a passenger in the vehicle. Additional information regarding the design, construction, and operation of a crash locking tongue may be found in a co-pending application entitled "Crash Locking Tongue" filed simultaneously with the present disclosure, the entire content of which is hereby incorporated by reference.

The base plate 15 may comprise a metal, a metal alloy, or another high strength material formed as a single or solid piece. The base plate 15 is used to latch or reversibly couple with the buckle 12 in the seat belt restraining system 7. The metal or metal alloy may include, but not be limited to a AISI 4130 alloy steel that incorporates one or more strengthening agents, such as chromium or molybdenum, to name a few. When desirable, the base plate 15 may be heat treated to harden the metal or metal alloy and/or plated (e.g., chrome plating, etc.) to further enhance properties, including without limitation, aesthetic qualities, the strength, or corrosion resistance of the base plate 15.

The cover material 35 may be placed in contact with the surface of the base plate 15 through the use of a molding process, such as a compression molding process or injection molding process. The composition of the overmolded cover material 35 generally is not restricted. Alternatively, the composition of the overmolded cover material 35 may comprise one or more types of moldable thermoplastic polymers. For example, these thermoplastic polymer(s) may include, but not be limited to, one or more of a polytetrafluoroethylene, a polyphenylene, a polystyrene, a polyamide, an acrylic, a phenolic, a polyacetal, a polybutadiene, a polyethylene-polybutadiene, a polyetherimide, and a mixture or copolymer thereof. Alternatively, the cover material may comprise one or more polyamides, such as, without limitation, NYLON® 6, NYLON® 11, or NYLON® 12. When desirable the overmolded cover material 35 may further include one or more additives (colorants, dispersants, biocides, flame retardants, etc.) in order to enhance manufacturability and/or performance.

The lockbar 20 may be made of the same or similar material as the overmolded cover material 35. Alternatively, the lockbar 20 and the overmolded cover material 35 are different materials. Since the lockbar 20 does not need to displace the belt webbing 9, a lockbar 20 having a lower stiffness may be utilized when desired. However, the material utilized in the lockbar 20 may be selected to enhance the ability to clamp the belt webbing (i.e., increase coefficient of friction) and/or be resistant to the occurrence of wear upon contact between the lockbar 20 and the belt webbing 9.

Referring again to the perspective view of the front of the crash locking tongue 10 shown in FIG. 3A and to the partial cross-sectional view shown in FIG. 3B taken along the plane x for the crash locking tongue of FIG. 3A, the lockbar 20 has a centerline c that is perpendicular to length L of the crash locking tongue. The lockbar 20 is shown having a front edge 40 that extends through the slot 8 and at least one fin 45, alternatively, a pair of fins 45 located near the front edge 40 that protrude from the bottom of the lockbar 20. The angular contact between the fins 45 and the overmolded cover material 35 allows for the centerline c of the lockbar 20 to be maintained perpendicular to the length L of the crash locking tongue 10.

The fins 45 contacting the overmolded cover material 35 along with the presence of the elastomeric spring provides a tight fit for the lockbar 30 in slot 8 of the crash locking tongue 10. This tight fit is useful in preventing the occurrence of buzz, squeak, and rattle (BSR) of the seat belt restraining system during the movement of the vehicle. Once the belt webbing is installed, the thickness of the belt webbing along with the presence of the fins 45 provides for the retention of the lockbar 20 in the crash locking tongue 10, thereby, preventing the dislocation or removal of the lockbar from its installed position. The fins 45 do not engage the belt webbing. The thickness of the webbing makes rotating the lockbar 20 impossible in a reverse manner of insertion prior to the addition of the webbing. Finally, the angular contact that occurs between the fins 45 and the overmolded cover material 35 allows the guide wings to be pulled in tight to the overmolded cover material 35.

Figure 4B:
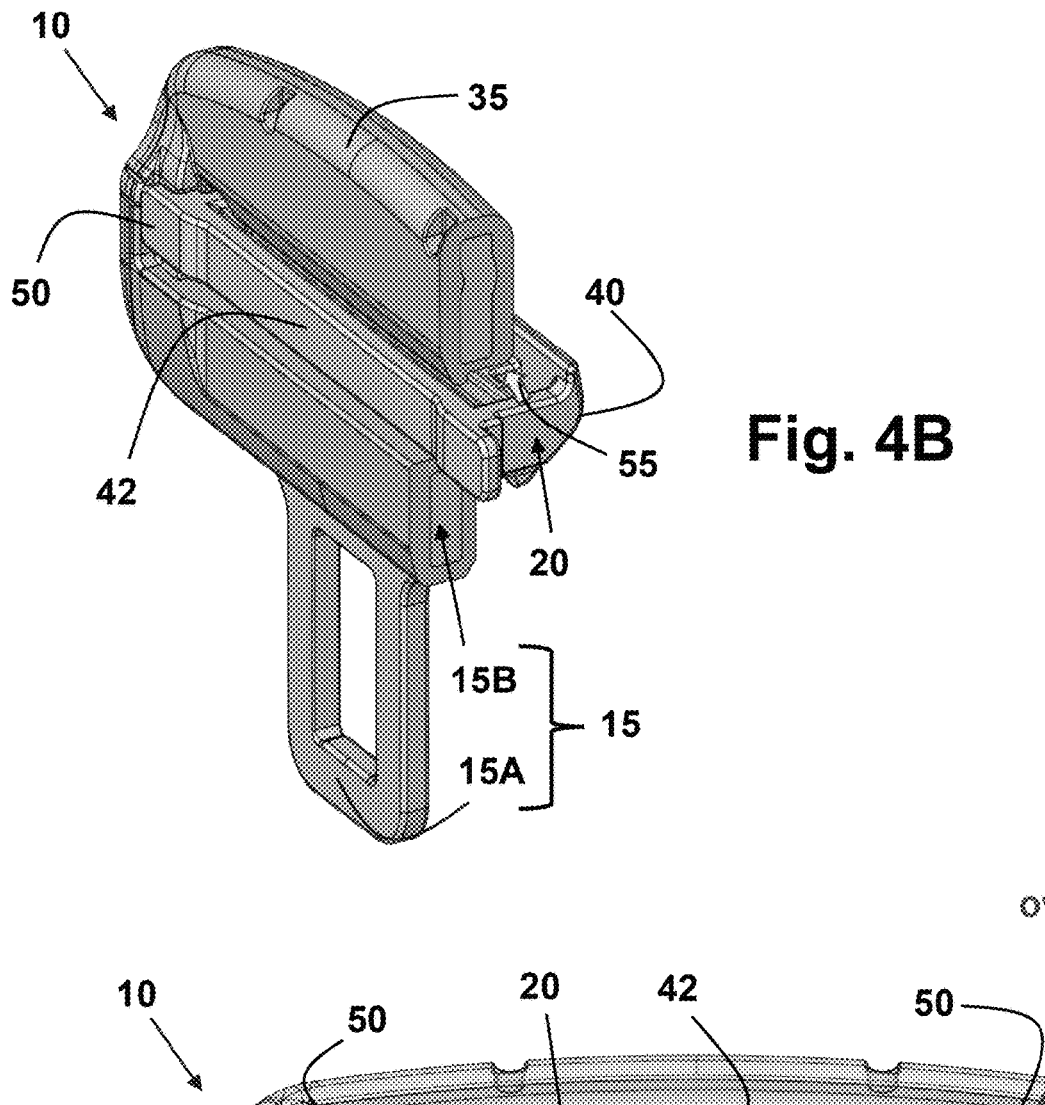
FIG. 4B is a partial cross-sectional view of a crash locking tongue with a lockbar installed therein.
Figure 4A:
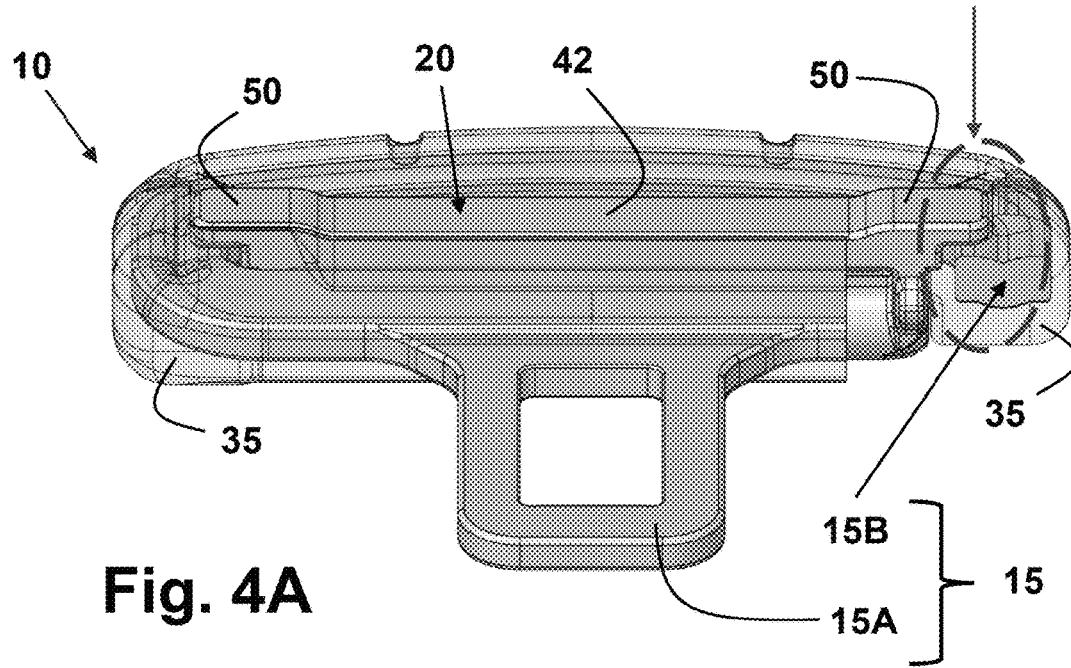
FIG. 4A is a top-down cross-sectional view of the back-side of a crash locking tongue with a lockbar installed therein.

Referring now to FIGS. 4A and 4B, the backside 42 of a crash locking tongue is shown. In the context of a crash locking tongue 10, the guide wings 50 refer to a feature in the lockbar 20 that assists in directing the belt webbing into the locking mechanism during a collision. Thus, the guide wings 50 are structures that guide the webbing to ensure that it is properly engaged and locked in the crash locking tongue 10. The guide wings 50 may overlap the overmolded cover material 35 in the crash locking tongue 10 and/or overlap part of the upper portion 15B of the base plate 15. Alternatively, the guide wings 50 overlap both the overmolded cover material 35 and the upper portion 15B of the base plate 15. This overlap prevents the lockbar 20 from becoming disengaged from the cover material 35 and/or base plate 15 when the seat belt restraining system is in use. In addition, this overlap also provides for improved load transfer within the crash locking tongue 10.

Figures 5A, 5B:
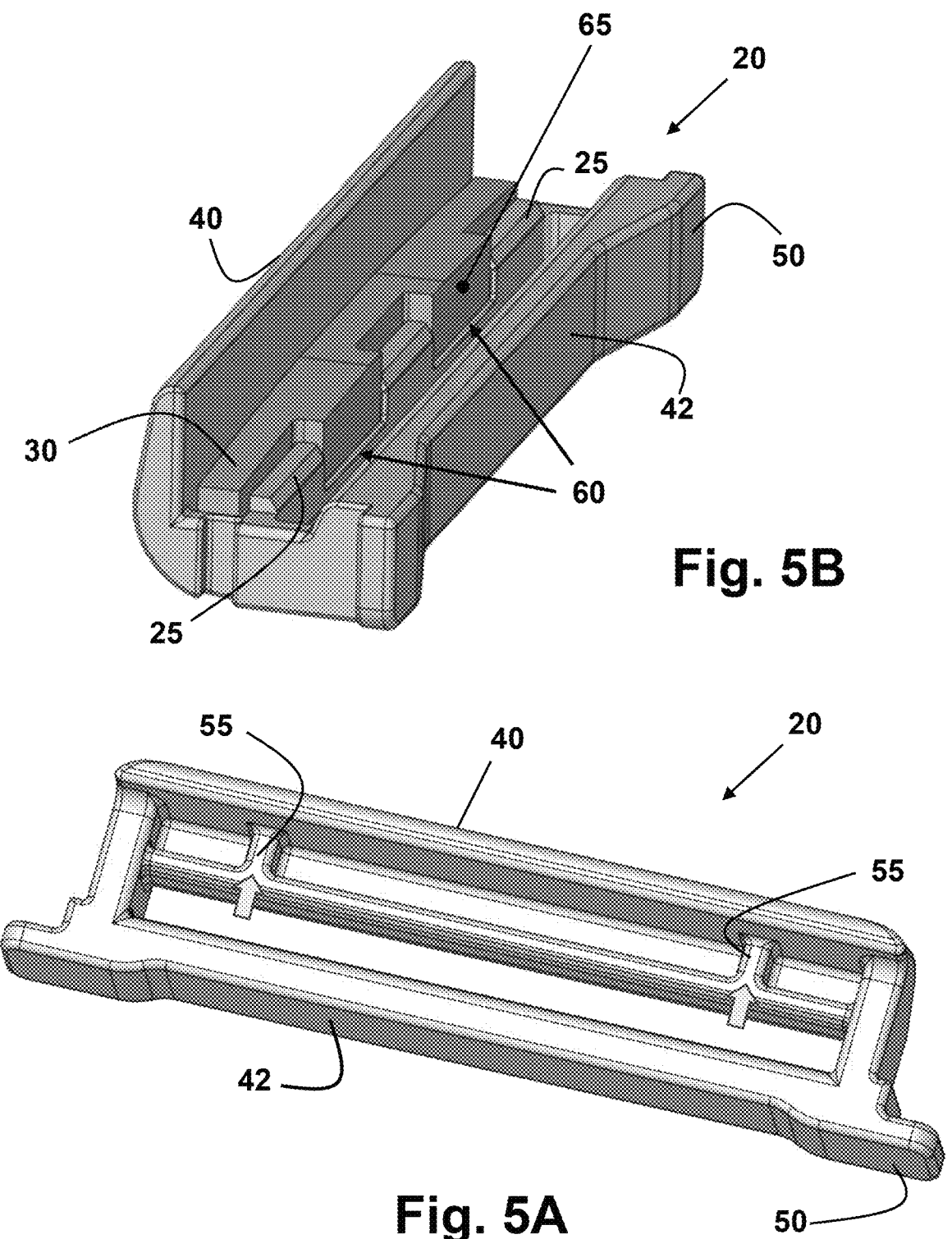
FIG. 5A is a top-down perspective view of a lockbar formed according to the teachings of the present disclosure.
FIG. 5B is top-down perspective view of another lockbar formed according to the teachings of the present disclosure.

Still referring to FIG. 4B, the lockbar 20 may contain one or more strengthening ribs 55 that are configured to assist in enhancing the strength of the lockbar and the stability associated therewith. These strengthening ribs, which are more clearly seen in FIG. 5A, provide additional connection points between the body of the lockbar 20 and the front edge 40 of the lockbar 20. The presence of these strengthening ribs 55 improves the load transfer from the lockbar 20 into the overmolded cover material by increasing the available surface area. In addition the rocking of the lockbar 20 installed in the crash locking tongue is reduced by the presence of the strengthening ribs 55 due to the shifting of the location for the contact points from being on an axis to being in a plane.

Referring now to FIG. 5B, the lockbar 20 and the elastomeric spring 30 may be configured, such that the lockbar 20 comprises one or more openings 60. When the elastomeric spring 30 is compressed, the elastomeric spring 30 may elongate and/or be pushed through these openings 60, which provides an additional surface 65 that can engage with the belt webbing in order to increase the clamping effect or locking load. In this case, the elastomeric spring 30 may assist or aid in providing the clamping force against the belt webbing. The geometry of the clamping surface 25 of the lockbar 20 may comprise a smooth surface or a rough surface.

The composition of the elastomeric spring 30 generally is not restricted in that it may comprise any elastomeric or rubber material. Alternatively, this elastomeric or rubber material may comprise any moldable thermoplastic or thermoset polymers, including but not limited to, one or more of a silicone, a natural butyl rubber (NBR), a polychoroprene rubber, a styrene-butadiene rubber (SBR), an ethylene propylene diene monomer (EPDM) rubber, a chlorosulfonated polyethylene (CSPE), a polypropylene, and a mixture or copolymer thereof.

Figure 6:
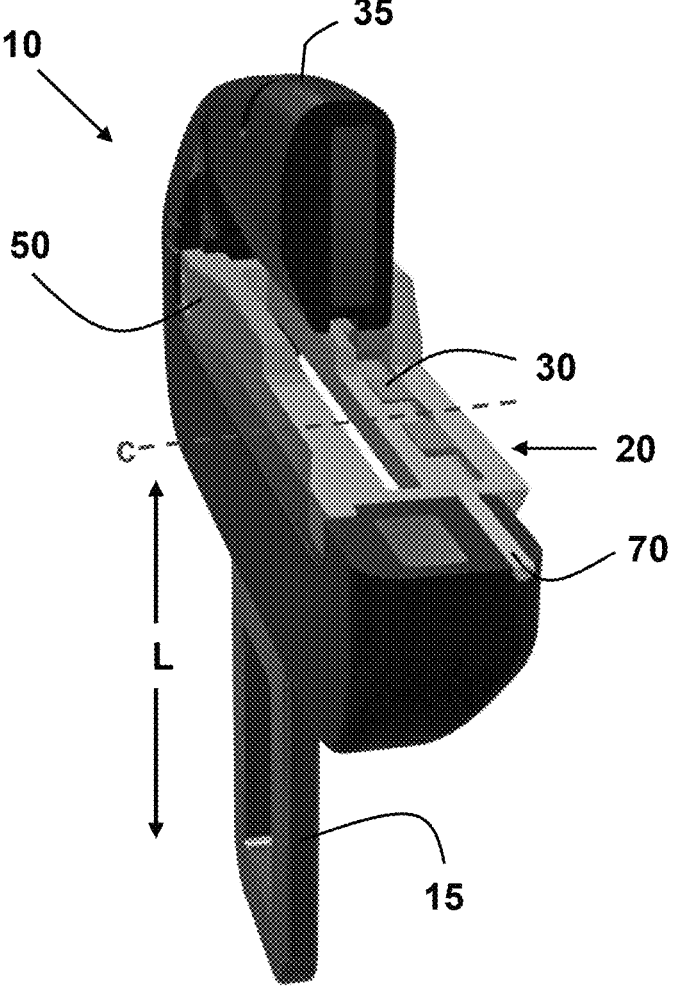
FIG. 6 is partial cross-sectional view of another lockbar installed in a crash locking tongue.

Referring now to FIG. 6, the lockbar 20 as installed in crash locking tongue 10 perpendicular to the length L of the tongue 10, includes the integration of the retention features, such as the fins, guide wings 50, elastomeric spring 30, and thickness of the belt webbing, into the lockbar 20. Thus, the presence of any form of retention pins 70 are no longer necessary. Thus, the complexity, e.g., number of components, in the lockbar 20 can be effectively reduced. However, alternatively, when desirable, the lockbar 20 may comprise the use of such retention pins 70 that interact with the lockbar 20 after being installed within the crash locking tongue 10.

According to another aspect of the present disclosure, when the lockbar translates vertically, it clamps or applies a force to the belt webbing on the side of the webbing that faces the restrained passenger. The application of force by the lockbar in this direction maximizes the webbing resistance as determined according to the Capstan or belt friction equation (e.g., Euler-Eytelwein formula) as described in Equation 1 below.

$$T_2 = T_1 * e^{(\mu * \theta)} \qquad \text{Eq. 1}$$

In the Capstan equation, $T_2$ represents the tension on the side of belt webbing where the force is being applied, $T_1$ represents the tension on the side of the belt webbing where the force is being resisted, $\mu$ is the coefficient of static friction between the belt webbing and the clamping surface of the lockbar, and $\theta$ is the wrap angle (in radians) for the belt webbing around the restrained passenger. The Capstan equation generally indicates that the tension on the side where the force is being applied exponentially increases when the wrap angle and/or the coefficient of friction is increased.

Figure 8:
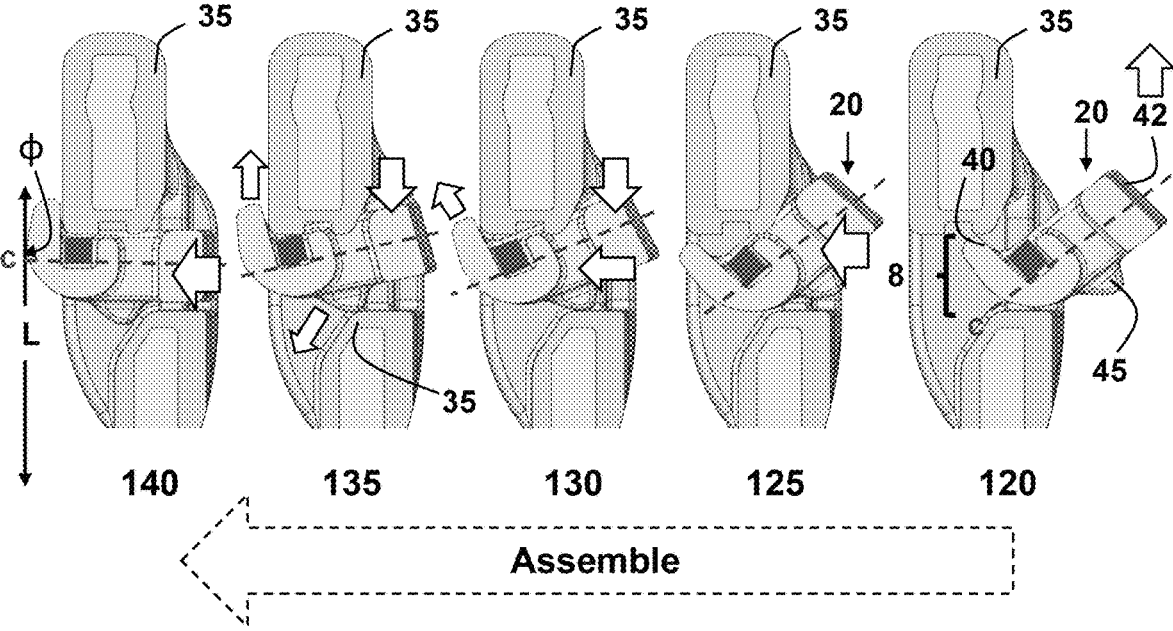
FIG. 8 is a schematic representation describing several of the steps conducted in the method of FIG. 7 for assembling the lockbar in the crash locking tongue of FIG. 3B.

According to another aspect of the present disclosure, a method for assembling a lockbar formed according to the present disclosure into a crash locking tongue for use in a seat belt restraining system of a vehicle is provided. Referring now to FIGS. 7 and 8, this method 100 generally comprises the following steps. First, a base plate having a lower portion and an upper portion is provided 105. The lower portion of the base plate is configured to reversibly couple with a buckle in the seat restraining system. The upper portion of the base plate has an open slot through which a belt webbing can extend in order to retrain the movement of a passenger in the vehicle. Then a cover material is overmolded 110 onto at least a part of the upper portion of the base plate, such that the slot remains open. A lockbar as previously described and as further defined herein is then provided 115 (e.g., with the elastomeric spring installed therein).

The physical assembling of the lockbar into the crash locking tongue proceeds by tilting 120 the back edge 42 of the lockbar upward (↑), so that the front edge 40 of the lockbar is allowed to enter the open slot 8. The lockbar is then pushed 125 horizontally (←) through the open slot until the front edge of the lockbar begins to exit the slot. Then, the lockbar is forced 130 downward (↓) while continuing to push the lockbar horizontally (←) through the open slot. In this step, the front edge 40 of the lockbar begins to move upward (↑) as the front edge 40 exits the slot 8. As the back end 42 of the lockbar is continued to be pushed downward (↓) the front end 40 continues to move upward (↑). The fins 45 of the lockbar are allowed 135 to engage the overmolded cover material forming angular contact therewith while moving in a downward (↓) motion. The lockbar is continued to be pushed 140 through the slot until the centerline c of the lockbar is forms a perpendicular angle φ with the length L of the crash locking tongue. In this step, the angular contact between the fins 45 and the overmolded cover material allows the guide wings to be pulled in tight against the overmolded cover material. The method 100 may further comprise locking 145 the lockbar in place within the crash locking tongue by allowing the belt webbing to extend through the lockbar.

For the purpose of this disclosure, the terms "about" and "substantially" are used herein with respect to measurable values and ranges due to expected variations known to those skilled in the art (e.g., limitations and variability in measurements).

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one opening", "one or more openings", and "opening(s)" may be used interchangeably and are intended to have the same meaning.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A lockbar in a crash locking tongue of a seat belt restraining system used in a vehicle, wherein the crash locking tongue includes the lockbar, a base plate having a lower portion and an upper portion, and a cover material overmolded onto the base plate; the lower portion of the base plate being configured to be reversibly coupled to a buckle in the seat belt restraining system and the upper portion of the base plate having a slot through which a belt webbing extends in order to restrain the movement of a passenger in the vehicle, the lockbar comprising:

a back edge and a front edge, the front edge being configured to pass through the slot in the upper portion of the base plate;

one or more fins configured to assist in positioning the lockbar in the slot; the fins being located on a bottom surface of the lockbar near the front edge;

a pair of guide wings configured to prevent the lockbar and the overmolded cover material from becoming disengaged when the seat belt restraining system is in use, each of the guide wings being located on the back edge adjacent to opposite sides of the lockbar;

a clamping surface that is in contact with the belt webbing; and an elastomeric spring;

wherein the lockbar undergoes a vertical translation upon the occurrence of a vehicle accident, the vertical translation causes the clamping surface to apply an inward pressure on the belt webbing, thereby, reducing or eliminating movement of the belt webbing.

2. The lockbar according to claim 1, wherein the belt webbing loops around the lockbar when the crash locking tongue and the buckle are coupled.

3. The lockbar according to claim 1, wherein the inward pressure occurs between the clamping surface of the lockbar and one or more of the overmolded cover material and the base plate.

4. The lockbar according to claim 1, wherein the lockbar further comprises at least one feature that forms an interlock region with the overmolded cover material in order to assist in load distribution.

5. The lockbar according to claim 1, wherein the lockbar further comprises one or more openings configured such that upon compression of the elastomeric spring caused by the vertical translation of the lockbar, at least a portion of the elastomeric spring is forced through the one or more openings in the lockbar.

6. The lockbar according to claim 1, wherein the one or more fins provide angular contact with the overmolded cover material, thereby, allowing the guide wings to be pulled in tight against the overmolded cover material.

7. The lockbar according to claim 1, wherein the elastomeric spring contacts the overmolded cover material and/or the base plate, such that buzz, squeak, and rattle (BSR) in the seat belt restraining system is prevented.

8. The lockbar according to claim 1, wherein the guide wings overlap with one or more of the overmolded cover material and the base plate.

9. The lockbar according to claim 1, wherein the lockbar is prevented from being removed from the crash locking tongue by the thickness of the belt webbing.

10. The lockbar according to claim 1, wherein the lockbar further comprises one or more strengthening ribs.

11. The lockbar according to claim 10, wherein the one or more strengthening ribs allows for more efficient load transfer from the lockbar into the overmolded cover material due to an increase in surface area and/or reduces rocking of the lockbar in the crash locking tongue.

12. A method of assembling a lockbar in a crash locking tongue for use in a seat belt restraining system of a vehicle; the method comprising the steps of:

providing a base plate having a lower portion and an upper portion, the lower portion of the base plate being configured to reversibly couple with a buckle in the seat restraining system, the upper portion of the base plate having an open slot through which a belt webbing can extend in order to retrain the movement of a passenger in the vehicle;

overmolding a cover material onto at least a part of the upper portion of the base plate, such that the slot remains open;

providing a lockbar formed according to claim 1;

titling the back edge of the lockbar upward, so that the front edge of the lockbar is allowed to enter the open slot;

pushing the lockbar horizontally through the open slot until the front edge of the lockbar begins to exit the slot;

forcing the lockbar downward while continuing to push the lockbar through the open slot;

allowing the fins of the lockbar to engage the overmolded cover material forming angular contact therewith; and continuing to push the lockbar horizontally through the slot until the angular contact between the fins and the overmolded cover material allows the guide wings to be pulled in tight against the overmolded cover material.

13. The method according to claim 12, wherein the method further comprises locking the lockbar in place within the crash locking tongue by allowing the belt webbing to extend through the lockbar.

14. A seat belt restraining system comprising a buckle, a belt webbing to restrain the movement of a passenger in a vehicle and a crash locking tongue comprising the lockbar according to claim 1.

15. The seat belt restraining system according to claim 14, wherein compression of the elastomeric spring upon the vertical translation of the lockbar enhances the engagement between the lockbar and the belt webbing.

16. The seat belt restraining system according to claim 14, wherein the belt webbing includes a torso side that faces the passenger and the vertical translation of the lockbar applies the pressure to the torso side.

17. The seat belt restraining system according to claim 14, wherein the pressure applied to the belt webbing clamps the belt webbing in place on a side of the belt webbing that faces the passenger.

18. The seat belt restraining system according to claim 14, wherein the clamping of the belt webbing provides a maximum webbing resistance as defined by a Capstan or belt friction equation.

* * * * *